United States Patent [19]

Congleton

[11] 4,419,068
[45] Dec. 6, 1983

[54] MOLDING APPARATUS HAVING A VENTED FEMALE MOLD MEMBER FOR FORMING FOAMED EGG CARTONS

[75] Inventor: Wayne L. Congleton, Walnut, Calif.

[73] Assignee: Dolco Packaging Corporation, Sherman Oaks, Calif.

[21] Appl. No.: 356,998

[22] Filed: Mar. 11, 1982

Related U.S. Application Data

[62] Division of Ser. No. 235,203, Feb. 17, 1981, Pat. No. 4,382,536.

[51] Int. Cl.³ ................ B29C 17/03; B29D 27/00
[52] U.S. Cl. .................. 425/398; 229/2.5 EC; 229/44 EC; 264/321; 425/401; 425/812; 425/817 R
[58] Field of Search .......... 425/398, 394, 812, 401; 264/321, 45.5, 322; 229/2.5 EC, 44 EC

[56] References Cited

U.S. PATENT DOCUMENTS

| | | | |
|---|---|---|---|
| 3,185,370 | 5/1965 | Reifers et al. | 229/2.5 EC |
| 3,470,281 | 9/1969 | Knowles | 425/401 X |
| 3,532,786 | 10/1970 | Coffman | 264/322 X |
| 3,640,668 | 2/1972 | Brown et al. | 264/321 X |
| 3,703,255 | 11/1972 | Wade | 264/321 X |
| 3,846,526 | 11/1974 | Wade | 264/321 X |
| 3,917,152 | 11/1975 | Burkett | 229/2.5 EC |
| 3,917,770 | 11/1975 | Jackson | 229/2.5 EC X |
| 4,143,111 | 3/1979 | Irwin | 264/321 X |

Primary Examiner—Philip E. Anderson

[57] ABSTRACT

An egg carton made from expanded polystyrene with a nonexpanded skin on one side includes integrally formed cover and tray portions interconnected together by a pair of hinges adjacent opposite sides of a hingeband. The tray is divided into a plurality of cells by a plurality of partitions. At least some of the partitions have a top flap portion hinged to the top of the partition by the skin of the polystyrene. Each cell further has a pliant inside surface provided by one or more grooves in the interior cell walls. A post extending from the inside surface of the cover is formed opposite a tray support surface using a thermo molding method by which a protrusion in a top mold is inserted into a nonvented cavity of a bottom mold. A pair of integrally molded hinge posts extend above the hingeband a distance less than the width of the hingeband between hinges and seat into a groove in the hingeband when the top is in closure relationship to the tray.

1 Claim, 7 Drawing Figures

MOLDING APPARATUS HAVING A VENTED FEMALE MOLD MEMBER FOR FORMING FOAMED EGG CARTONS

This is a division of application Ser. No. 235,203, filed Feb. 17, 1981, U.S. Pat. No. 4,382,536.

BACKGROUND OF THE INVENTION

The present invention relates to expanded foam cartons and in particular to an expanded foam carton for storing and shipping eggs.

Since expanded foam egg cartons first came into popular usage, there have been many efforts to improve the egg cartons to decrease the incidence of egg breakage and to improve the versatility of the egg carton while maintaining the outer dimensions of conventional foam egg cartons. The present invention achieves these objectives by providing a novel thermo molded polystyrene foam egg carton which is provided not only with a novel structural configuration but is molded in accordance with novel molding methods.

Specifically, the present invention provides a unitary egg carton structure having a cover and a tray interconnected by a hinge apparatus defined by a pair of hinges connected by a hingeband. The tray of the thermo molded polystyrene egg carton includes at least one longitudinal partition member extending between opposite end walls and essentially bisecting the tray along its longitudinal dimension. A plurality of transverse partition members extend between the front and rear walls of the carton and intersect the longitudinal partition member for defining a plurality of cells in the tray. The walls of the longitudinal partition member and the transverse partition members intersect to define a contoured inner portion of the circumferential side wall for each cell where each contoured inner side wall portion extends upwardly from the tray base. The side wall of each cell is completed by the inside portion of the front, rear or end walls of the tray depending on the location of the cell. Each intersection between a transverse wall of a transverse partition member and a longitudinal wall of a longitudinal partition member defines a curved transition region.

In accordance with the invention, at least one expansion groove is impressed in each inner side wall for increasing its pliancy. By providing such a pliant inner side wall, each cell is capable of accepting a medium size egg but also being expandable to accept an egg as large as a jumbo size egg. Hence, a single egg carton structure can be used for all sizes of eggs. Such versatility is not possible in existing egg cartons because the cells in which the eggs are placed are substantially incapable of expanding to accommodate larger eggs. Therefore, several cartons having different sized cells are required to allow packaging of all sizes of eggs from the medium size up to the jumbo size.

An additional advantage provided by the pliant inner side walls of each cell is the capability of inserting an egg either pointed end down or pointed end up. Because of the circumferential rigidity of the inner walls of the cells in prior art cartons, the cells were designed to accept an egg pointed end down. Consequently, additional care had to be taken to assure that the egg was properly placed in the cell. Such is not required in the present invention. This is particularly advantageous since the lifting of government regulations requiring that eggs be stored and shipped with the pointed end down.

Still another aspect of the invention is the inclusion of a bendable flap which extends from and is part of the partition between adjacent cells of the carton. Such bendable flaps not only protect the eggs in adjacent cells from coming in contact with one another during shipping and handling of the carton but also provide a thinner pad between cells so that each cell will be capable of accommodating the larger eggs.

Heretofore, such thin resiliently bendable flaps were not incorporated because of perceived limitations on the capabilities of thermo molding polystyrene material. However, in accordance with the invention, it has been found that a thin polystyrene flap can be thermo formed utilizing a sheet of polystyrene with a nonexpanded skin on one side. Specifically, the thin flap can be formed by providing a female mold member with a cavity therein and a corresponding male mold member with a protrusion having a size and shape which is adapted to be inserted into the cavity of the female mold member. The polystyrene sheet with the skin side facing the male mold member is then positioned between the juxtaposed male and female mold members and the protrusion is then inserted into the cavity to a depth selected so that the minimum gap between the protrusion and the cavity is about one-tenth the thickness of the polystyrene. Further, the height of the male mold member protrusion and the depth of the female mold member cavity are selected so that the skin will stretch but the foam layer of the polystyrene sheet will rupture along a hinge region of the polystyrene sheet during the molding process. The result is a flap hinged to the top of the partition whereby the flap is resiliently movable relative to the remainder of the partition. The hinge is essentially the skin portion of the polystyrene sheet without the expanded foam layer thereon. Of course, such a flap end skin hinge may be provided on selected ones of the transverse partitions at selected locations along the longitudinal partition.

Still another feature of the carton in accordance with the invention is the incorporation of a centrally positioned cover support post which is integrally molded to extend from the interior surface of the cover. Of course, the post may be located at any position and more than one post may be provided. However, in the preferred embodiment, the cover support post is centered substantially about the centroid of the base portion of the cover.

It will be understood that heretofore such posts having a sufficient height to provide the necessary support function could not be thermo molded without producing a post with very thin walls and hence only limited structural support capabilities. The inability to mold such a cover support post resulted from the fact that cavities used to mold and post were vented. This venting caused the material comprising the walls of the post to be stretched to a thinness which made them incapable of providing substantial structural support. However, in accordance with the invention, it has been found that the utilization of an unvented cavity to form the post prevents a substantialy degree of stretching in the walls of post. Rather, the stretching of the material to from the post occurs to a great extent in the region of the base of the cover surrounding the post. Thus, a post can be formed which has a substantial wall thicknesses capable of providing the necessary support.

Finally, in accordance with the invention, the carton is provided with at least one hinge post which is integrally molded to protrude from the inside surface of the rear wall of the cover. The hinge post has a base portion extending laterally adjacent to the rear wall of the cover and a foot portion defining a longitudinal extension of the end of the base portion beyond the top edge of the rear wall of the cover by a distance which is less than the width of the hingeband between the pair of hinges connecting the cover to the tray. Additionally, a pair of recessed regions are provided in the hingeband so that the hinge post will seat in the recessed region of the hingeband when the cover is closed over the tray. Thus, the hinge posts prevent lateral movement of the cover relative to the tray when the cover is in closure relationship to the tray with the hinge posts seated in the recessed regions. This is particularly true when the hinge posts and the cover support post are both incorporated since the cover support post also prevents lateral movement of the cover relative to the tray when it is seated against the top of one of the partitions. When the carton employs a pair of spaced hinges with a hingeband therebetween, the hinge posts also serve to stabilize the cover on the tray and add compression strength to the back side of the carton. The depth of the posts can be varied to vary the amount of the strength of the carton. Thus, movement of the cover relative to the tray is substantially limited to vertical movement which is necessary to open or close the cover. The hinge posts may be strengthened by providing a generally concavely curved major surface facing the front wall of the cover.

BRIEF DESCRIPTION OF THE DRAWINGS

A complete understanding of the present invention and of the above and other advantages thereof may be gained from a consideration of the following description of the preferred embodiment taken in conjunction with the accompanying drawings in which:

FIG. 1A is a detail of one of the hinge posts in accordance with the invention;

DETAILED DESCRIPTION

Figure 1:
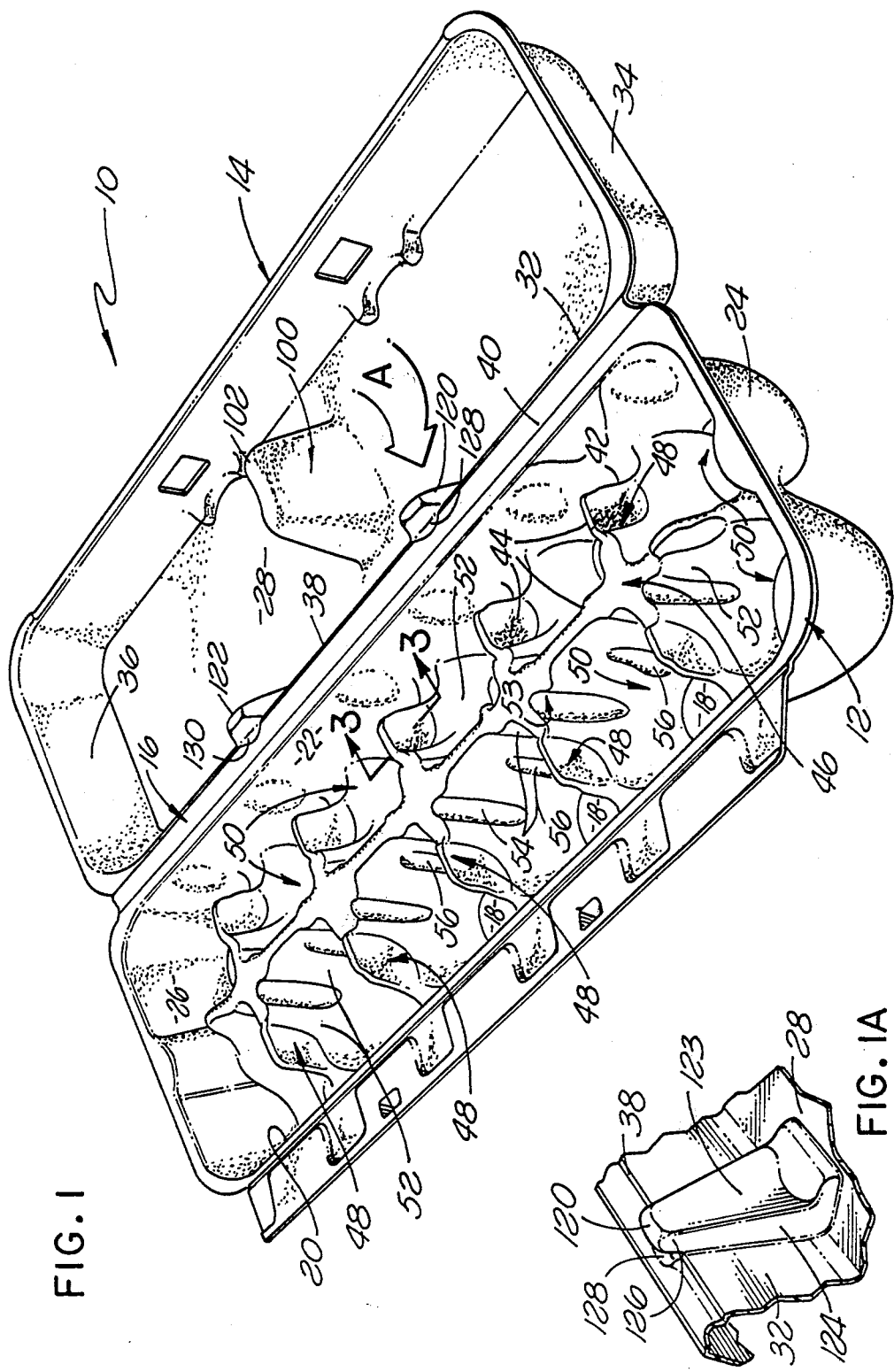
FIG. 1 is a perspective view of the inside of a carton in accordance with the invention.

Referring to FIG. 1, an egg carton 10 in accordance with the invention includes a tray 12 and a cover 14 interconnected together by hinge apparatus 16. The tray 12 has a base 18, a front wall 20, a rear wall 22, and end walls 24 and 26.

Similarly, the cover 14 has a base 28, a front wall 30, rear wall 32 and a pair of end walls 34 and 36. The base and the front, rear and end walls of the tray and cover are interconnected to one another and to the base so that the tray 12 and cover 14 form an opened, substantially box-like structure.

The hinge apparatus 16 interconnects the top edge of the rear wall 22 of the tray 14 to the top edge of the rear wall 32 of the cover 14. The hinge apparatus 16 includes a first hinge 38 disposed longitudinally along the top edge of the rear wall 32 to interconnect the top edge of the rear wall 32 to one edge of a hingeband 40. Similarly, a second hinge 42 longitudinally interconnects the top edge of the rear wall 22 of the tray 12 to the other edge of the hingeband 40 along the length of the rear wall 22.

In accordance with the invention, egg separating members 44 extend upwardly from the base 18 of the tray 12. The egg separating members 44 include at least one longitudinal partition member 46 positioned generally between the first and second end walls 24 and 26 of the tray 12. In addition, a plurality of transverse partition members 48 extend crosswise generally between the front and rear walls 20 and 22 of the tray 12. The longitudinal partition member 46 and the plurality of transverse partition members 48 define a plurality of cells 50 in the tray 12.

The longitudinal partition member 46 has a pair of contoured converging walls extending upward from the base 18 of the tray 12 and meeting at the apex of the longitudinal partition member 46. Similarly, the plurality of transverse partition members 48 each have a pair of contoured converging transverse walls which extend upwardly from the tray base 18 with the contoured walls meeting to form a plurality of cells 50. Each cell 50, thus, has a contoured inner side wall 52 extending upwardly from the tray base 18 which is defined by at least one section of the longitudinal wall and at least one section of one of the transverse walls intersecting the longitudinal wall. Each intersection between one of the transverse walls of one of the transverse partition members 48 and one of the longitudinal wall sections of the longitudinal partition member 46 defines a curved transition region 53 where the dimensions of the contoured inner side wall 52 of each cell 50 are selected to initially receive an egg such as a medium size egg.

In accordance with the invention, the carton 10 is thermo molded from a single piece of expanded foam material such as polystyrene with a plurality of expansion grooves 54 molded into the contoured inner side wall 52 of each cell 50. In the preferred embodiment, an expansion groove 54 is vertically disposed along the curved transition region 53 of each cell 50 and an expansion groove 56 is disposed in the longitudinal wall portion of the contoured inner side wall 52 of each cell 50. The molded grooves 54 and 56 eliminate the lateral rigidity of the inner side wall of the cells of prior egg cartons and provides instead a contoured inner side wall 52 which is pliant. Such pliance enables each cell 50 to adapt to virtually any size of egg from medium size to jumbo size and permits the egg to be inserted either pointed end down or rounded end down.

In accordance with the invention, the front wall 20 and the rear wall 22 and the two side walls 24 and 26 of the tray 12 are generally planar to provide both transverse and longitudinally rigidity. Of course, it will also be appreciated that the outside dimensions of the carton must conform to those of previous egg cartons to enable an egg carton in accordance with the invention to be stacked and fit into conventional egg carton baskets along with a plurality of other similar egg cartons. As such, the significant advantage of the invention is that by providing expansion grooves in the contoured inner side walls of each of the cells away from the front wall, rear wall and end walls, that the expansion of each of the cells to accommodate, for example, a jumbo egg, occurs inwardly into the space between adjacent cells. Thus, a carton with standard outside dimensions is provided with cells sufficiently large to hold even jumbo-sized eggs.

Figure 2:
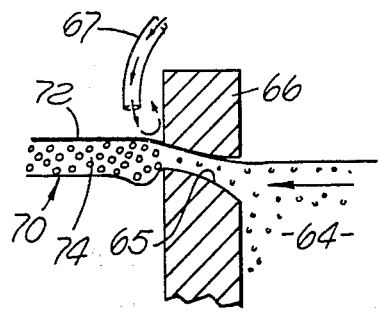
FIG. 2 is a simplified illustration of the means by which polystyrene is extruded to provide an expanded polystyrene sheet with a nonexpanded polystyrene skin on one side of an expanded polystyrene foam layer.

Referring next to FIG. 2, the egg carton in accordance with the invention is made by thermo molding a sheet of expanded polystyrene 70. The expanded polystyrene sheet 70 has a thin nonexpanded polystyrene skin 72 on one side of a thicker layer 74 of expanded polystyrene material. The polystyrene sheet 70 with the nonexpanded polystyrene skin 72 is formed by extruding a composition 64, comprised of melted polystyrene and a compressed gas such as Freon, through an orifice 65 in a die 66. As the melted polystyrene exits the die 66 through the orifice 65, the pressure relief lets the gas, such as Freon, expand. On one side of the resultant expanded sheet 70, however, a cold air duct 67 is provided to blow cold air on the surface of the extruded polystyrene sheet 70. The cold air arrests the cell expansion thereby creating the thin skin 72 of nonexpanded polystyrene.

Figure 3:
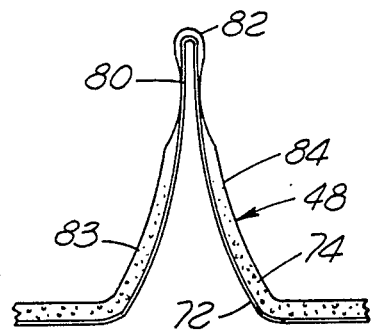
FIG. 3 is a cross-sectional plan view through section 3—3 of FIG. 1 illustrating the configuration of the resilient flap in accordance with the invention.

Using the expanded polystyrene sheet with a nonexpanded polystyrene skin, it has been found that when male and female mold members are provided with a sufficiently narrow mold gap therebetween relative to the thickness of the expanded polystyrene sheet, that the upward pressure of a male mold member into a cavity of a female mold member will cause a physical separation of the expanded polystyrene layer 74 but will only stretch the skin portion 72 of the sheet 70. The result is a polystyrene skin hinge region which is very flexible. Such a skin hinge is particularly useful in accordance with the invention to provide a flap to extend from the apex of each section of each transverse partition between adjacent cells 50. Referring more specifically to FIG. 3, each transverse partition 48 has an upper flap 82 which is hinged by a skin hinge 80 to the pair of walls 83 and 84 comprising the transverse partition 48. The molding procedure to be described hereafter is such that the expanded foam layer 74 is separated from the nonexpanded polystyrene skin 72 to form the hinge region 80.

Figure 5:
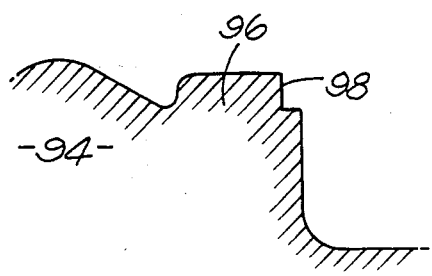
FIG. 5 is a cross-sectional view of a portion of a male and female mold members utilized to make the thin, resiliently deformable flap extending from one or more of the partitions in accordance with the invention.
Figure 4:
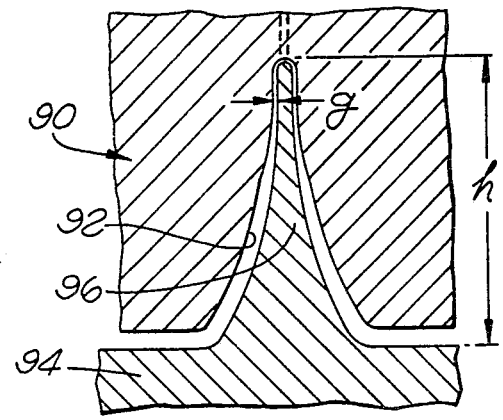
FIG. 4 is a side plan view of the male mold member illustrated in FIG. 3.

Referring to FIGS. 4 and 5, the flap 82 and connecting hinge 80 illustrated in FIG. 3 may be formed by providing a female mold member 90 having a vented indenture 92 therein and a male mold member 94 with a protrusion 96 extending therefrom. In order to mold the above-described sheet of polystyrene to form the flap 82 illustrated in FIG. 3, the protrusion 96 of the male mold member 94 is aligned and positioned to be inserted into the indenture 92 of the female mold member 90. The indenture 92 and protrusion 96 each have a shape and size selected so that when the protrusion 96 is inserted into the indenture 92 the resultant mold gap between the outer surface of the indenture 92 and the outer surface of the protrusion 96 along at least an upper peripheral region therebetween will be sufficiently small for enabling the mold to stretch the polystyrene sheet placed between the female and male mold members 90 and 94 during molding by an amount sufficient to cause only the foam layer to separate transversely without causing the polystyrene skin to separate. In the preferred embodiment the mold gap "g" of FIG. 4 is selected to be approximately on the order of one-tenth the thickness of the polystyrene sheet to effect the above-described separation. In addition, the height of the male mold member "h" is selected so that the skin is not stretched beyond the rupture point.

The shape of the protrusion is also selected to prevent rupture of the skin while allowing rupture of the foam layer. Thus, referring to FIG. 5, the protrusion 96 adapted to make a flap with a skin hinge in accordance with the invention comprises a narrow flange having a generally vertical orientation. The height of the flange is selected sufficiently small so that the skin will not stretch beyond the rupture point but sufficiently high so that the foam layer will rupture to form the hinge region. In one specific embodiment it was found that the height of the outer edge of the mold flange defining the protrusion 96 was such that the skin would occasionally rupture. To alleviate this problem, a notch 98 was provided in the corner of the protrusion 96 at the region of its maximum height and hence at the region adjacent to which the polystyrene sheet will stretch the maximum amount. The notch 98 decreases the amount of stretch at this region and hence assures the skin will not rupture.

The method of making the above-described flap and skin hinge commences by positioning the polystyrene sheet between the mold members 90 and 94 with the skin side of the polystyrene sheet facing the outer surface of the male mold member 94. As the male mold member is inserted into the indenture of the female mold member with the polystyrene sheet therebetween, the skin portion of the polystyrene sheet will be stretched upward and will be "pushed through" the foam layer of the polystyrene sheet with the foam layer of the polystyrene sheet rupturing leaving the skin hinge 80 as shown in FIG. 3.

In one specific example, a suitable hinge 80 was formed using an expanded polystyrene sheet having a thickness of about 0.09 inches before molding where the mold gap "g" between the male mold member protrusion 96 about the apex of the protrusion 96 and the inside surface of the indenture 92 of the female mold member 90 was in the range of about 0.005 inches to 0.011 inches. (This same mold gap arrangement may also be used in the formation of the expansion groove regions in each cell to increase the pliancy of those regions.) The height of the protrusion 96 of the male mold member 94 was then selected so that the polystyrene stretched no more than about two and half times its prestretched length along the flap surfaces. The resultant upstanding flap region formed in accordance with the above description thus protects eggs placed in adjacent cells from coming in contact with one another by providing an upwardly extended cushion therebetween. Once the carton in accordance with the invention has been molded to provide the above-described flap regions, the protrusion 96 is removed from the indenture 92 and the molded polystyrene sheet is removed from the female and male mold members 90 and 94.

It will, of course, be appreciated that a bendable flap as previously described for the transverse partition sections between adjacent cells may also be provided at selected locations along the longitudinal partition 46 between adjacent cells 50 without departing from the invention.

Figure 6:
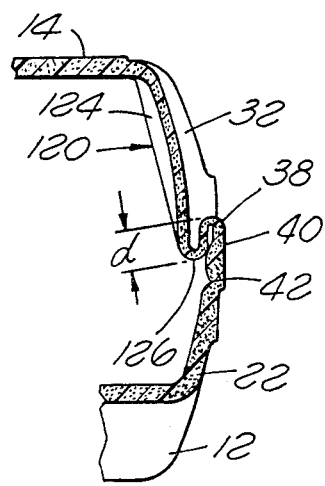
FIG. 6 is a cross-sectional plan view illustrating the hinge post in accordance with the invention when the cover is closed on the tray.

Referring to FIGS. 1 and 1A in conjunction with FIG. 6, the invention further comprises a pair of hinge posts 120 and 122 which are integrally molded to protrude from the inside surface of the rear wall 32 of the cover 14. Each of the hinge posts, e.g., the hinge post 120, has a base portion 124 which is laterally adjacent to the rear wall 32 of the cover 14 and has a curved or contoured major surface 123 facing the front wall 30 of the cover 14 to provide additional vertical strength to the hinge post 120. The base portion 124 may extend horizontally along the base 28 of the cover 14 as illustrated in FIG. 1A.

The hinge post 120 further has a foot region 126 which defines a longitudinal extension of the end of the base portion 124. The foot 126 extends beyond the top edge of the rear wall 32 and the first hinge 38 by a distance "d" which is less than the width of the hingeband 40 between the first and second hinges 38 and 42 respectively. It will be appreciated, of course, that the rear wall 32 is not precisely vertical but rather has an outward slant from the base 28 toward the first hinge 38.

In the preferred embodiment the hinge posts 120 and 122 likewise slant upwardly being displaced slightly from the vertical where the direction of slant is toward the hingeband 40. Thus, when the cover 14 is positioned in closed relationship over the tray 12, the foot 126 of the hinge post 120 will seat in a region of the hingeband 40 to provide a means for limiting the lateral and vertical movement of the cover 14 relative to the tray 12 when the cover 14 is in closed relationship to the tray 12. The posts also add compression resistance to the back wall of the cover and stability to the hingebands.

In the preferred embodiment, the seating of the foot 126 of the hinge post 120 is facilitated by providing a generally semi-circular depression or recess 128 in the hingeband 40 opposite the foot 126 of the hinge post 120. A similar depression recess 130 may also be provided in the hingeband 40 opposite the foot of the hinge post 122. Thus, as shown in FIG. 6, when the cover 14 is in closed relationship to the tray 12, the end of the foot 126 of the hinge post 120 seats into the depression 128 in the hingeband 40 to provide a means of supporting and preventing lateral movement between the cover 14 and the tray 12. Of course, it will be appreciated that the incorporation of the hinge posts 120 and 122 cooperate with the cover post 100 to prevent the cover 14 from moving laterally relative to the tray 12 when the cover 14 is in closed relationship to the tray 12. It will also be appreciated that the spacing of the support posts 120 and 122 along the rear wall 32 may be varied without departing from the spirit of the invention and the number of hinge posts may be varied in accordance with the design criteria for a particular egg carton without departing from the spirit of the invention.

It will finally be appreciated that various other changes and modifications can be made in the above-described carton in accordance with the invention and it is the objective of the following claims to include and incorporate all such changes and modifications as fall within the true spirit and scope of the invention.

What is claimed is:

1. A mold for molding a flexible portion in a polystyrene sheet having an expanded foam layer with a nonexpanded polystyrene skin on one side of the foam layer, comprising:
   a female mold member having a vented indenture with an outer surface;
   a male mold member having a protrusion with an outer surface, the protrusion adapted for being intermittently inserted into the indenture with a mold gap between the outer surface of the protrusion and the outer surface of the indenture, wherein the protrusion comprises an upstanding rib with a top edge having at least one corner notched for decreasing the amount by which the skin of a polystyrene sheet placed between the male and female mold members is stretched adjacent the notched corner region whereby the skin is stretched without separating.

* * * * *